March 4, 1924.
N. S. CAMERON
STEERING GEAR STABILIZER FOR AUTOMOBILES
Filed May 24, 1922
1,485,763
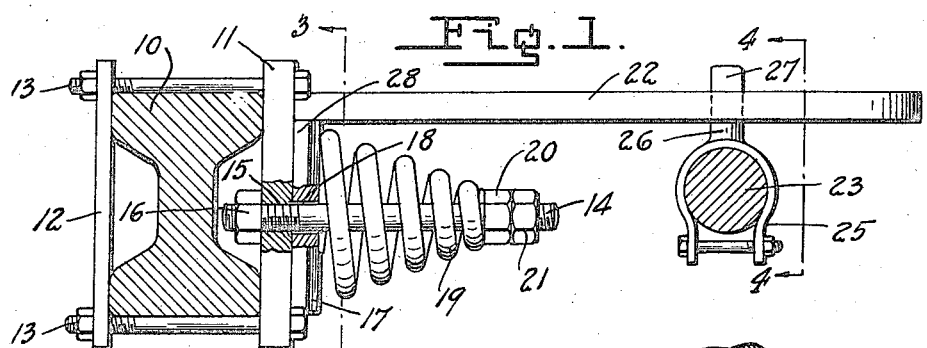
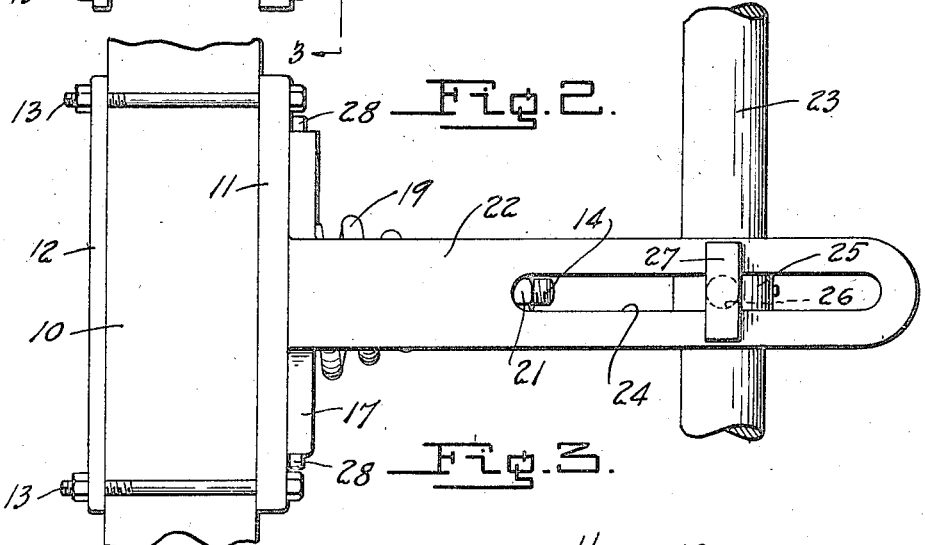
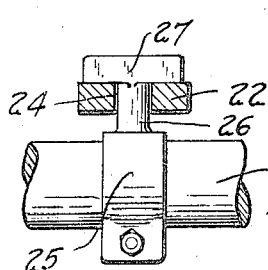
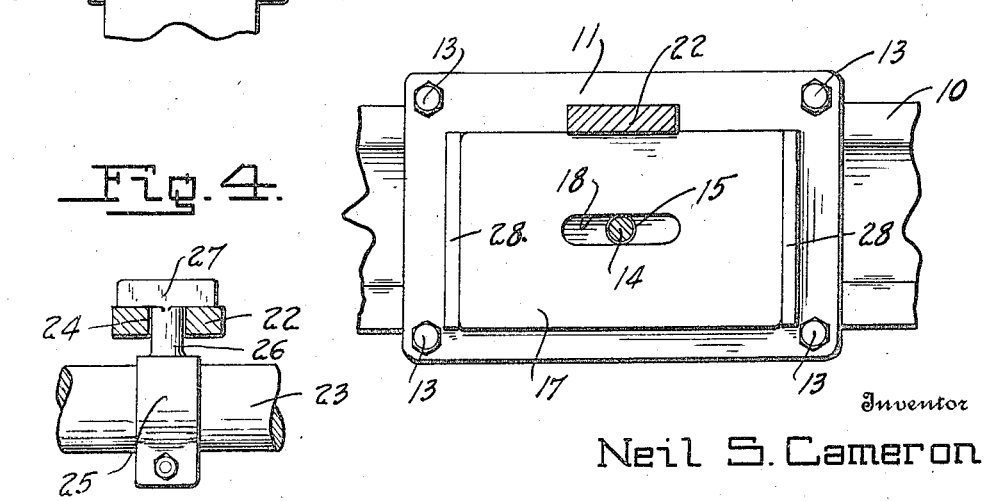
Inventor
Neil S. Cameron
By Watson E. Coleman
Attorney Patented Mar. 4, 1924.

1,485,763

UNITED STATES PATENT OFFICE.

NEIL S. CAMERON, OF TACOMA, WASHINGTON.

STEERING-GEAR STABILIZER FOR AUTOMOBILES.

Application filed May 24, 1922. Serial No. 563,300.

*To all whom it may concern:*

Be it known that I, NEIL S. CAMERON, a citizen of the United States, residing at Tacoma, in the county of Pierce and State of Washington, have invented certain new and useful Improvements in Steering-Gear Stabilizers for Automobiles, of which the following is a specification, reference being had to the accompanying drawings.

This invention relates to steering gear stabilizers for automobiles, and more particularly to a device of this character adapted to maintain straight ahead alignment of the steering wheels of the vehicle.

An important object of the invention is to provide a device of this character which may be very simply constructed and very readily attached to a vehicle and which, when so attached, compensates for relative movement of the transverse steering rod connecting the steering spindles of the steering wheels and the front axle to which the device is attached.

A further object of the invention is to provide a device of this character which may be very cheaply manufactured and which will be durable in service and a general improvement in the art.

These and other objects I attain by the construction and arrangement shown in the accompanying drawings wherein for the purpose of illustration is shown a preferred embodiment of my invention and wherein like reference characters designate like parts throughout.

In the drawings:

Figure 1 is a vertical sectional view showing apparatus constructed in accordance with my invention applied to the axle and steering link of an automobile;

Figure 2 is a fragmentary plan view thereof;

Figure 3 is a section on the line 3—3 of Figure 1 the spring being omitted; and

Figure 4 is a section on the line 4—4 of Figure 1.

Referring now more particularly to the drawings, the numeral 10 designates the front axle of an automobile and 11 a plate abutting the rear face of the angle and secured thereto in any suitable manner. In the present instance the plate 11 is shown as attached to the axle by means of a second plate 12 arranged upon the opposite side of the axle and connected with the plate 11 by means of bolts 13 whereby the plate 11 may be clamped against the axle. The numeral 14 designates a stud having one end thereof engaged in a threaded opening 15 formed centrally of the plate 11, the end of the stud projecting through the plate and having applied thereto a jam nut 16 or other suitable means for locking it against movement.

The numeral 17 designates a plate adapted to abut the rear face of the plate 11 and provided with a horizontal slot 18 adapted to receive the stud 14. The numeral 19 designates a conoidal volute spring having its large end abutting the plate 17 and its smaller end engaged by an adjusting nut 20 mounted upon the rear end of the stud 14 and held in adjusted position by means of a lock nut 21. It will be seen that rocking movement of the plate 17 about the stud 14 will be resisted regardless of the direction of rocking movement by the spring 19.

The numeral 22 designates a reduced right angular extension formed upon the plate 17 and forming an arm extending horizontally from the plate. The rear end of this arm projects above a horizontal link 23 extending transversely of the vehicle in substantial parallelism to the axle 10 and which is employed for connecting the steering spindles of the steering wheels, these connections being old and well known and accordingly not herein shown. That portion of the arm 22 projecting over the link 23 is longitudinally slotted, as indicated at 24.

The numeral 25 designates a yoke clamped upon the link 23 and provided with an upstanding neck 26 directed through the slot 24 of the arm 22 and of substantially the same diameter as the transverse width of the slot. This neck is provided at its upper or free end with a head 27 of greater length than the width of the slot and of the same width as the slot so that the head may be extended through the slot and when turned at right angles thereto prevent withdrawal of the arm from the neck 26. This head, when the yoke 25 is clamped upon the link 23, extends longitudinally of the link 23 and is accordingly disposed at right angles to the arm 22 and the slot 24 thereof. The numeral 28 designates shallow shoulders or some similar means applied to the plate 11 to prevent slipping of the plate 17 transversely of the vehicle.

In the use of my device when the same is applied as hereinbefore stated, when the wheels in driving straight ahead are engaged by any obstruction tending to deflect the same from a straight path, the engagement of the arm 22 with the neck 26 of the yoke 25 will cause the plate 17 to rock upon the plate 11 thereby tensioning the spring 19 and this tension will accordingly, when the wheels are released by the obstruction, return the link 23 to its normal position and accordingly the wheels to such normal position. It is pointed out that the employment of a conoidal spring of this character places the point of contact of the spring with the plate at points so far spaced from the axis of the spring that by a slight movement of the plate at the axis of the spring will provide a considerable movement of the spring at the point of contact and accordingly the plate will meet with the resistance of the spring without the necessity of a considerable shifting of the plate longitudinally of the bolt forming the support for the spring. The small end of the spring abutting the nut provides a restricted area for engagement eliminating the necessity of large washers and the like. Furthermore, it is pointed out that when the plate passes at right angle to the surface of the coil pressure applied by the plate will be transversely of the spring rather than longitudinally thereof and accordingly the resistance of the spring is lessened, thus preventing the application of too great a pressure of the spring during turning movements of the vehicle under the direction of the operator. In other words, the resistance of the spring is applied during slight movements of the wheels to a given extent but the resistance thereof does not increase proportionately to the distance of movement of the steering or drag link.

It will, of course, be obvious that the various parts of the device may be very readily applied to a vehicle without in any manner altering the construction thereof and that when so applied they will maintain the steering wheels in the proper alignment. It will furthermore be obvious that the construction as hereinbefore set forth is capable of some change and modification without materially departing from the spirit of my invention and I accordingly do not limit myself thereto except as hereinafter claimed.

I claim:—

In a stabilizer of the type described, the combination with an axle, a steering link extending in substantial parallelism with the axle and shiftable transversely, of a plate attached to the axle, a stud engaged in the plate and extended toward the steering link, a second plate abutting the first named plate and having a slot extending in a direction longitudinally of the axle and through which said stud extends, an arm formed on the last named plate extending in contact with and having a sliding pivotal connection with the link, a conoidal coil spring having the large end thereof abutting the plate surrounding said stud, an adjusting nut upon the stud and abutting the spring, and means carried by the first named plate limiting transverse movement of the second named plate thereon.

In testimony whereof I hereunto affix my signature.

NEIL S. CAMERON.